(12) United States Patent
Driscoll et al.

(10) Patent No.: US 8,966,965 B2
(45) Date of Patent: Mar. 3, 2015

(54) SELECTIVE CATALYTIC REDUCTION OUTLET MIXING DEVICE

(71) Applicant: Caterpillar Inc., Peoria, IL (US)

(72) Inventors: James Joshua Driscoll, Dunlap, IL (US); Arvind Jujare, Peoria, IL (US); Shawn Herold, East Peoria, IL (US); Jason Hudgens, Washington, IL (US); Sachin S. Deshmukh, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 46 days.

(21) Appl. No.: 13/861,781

(22) Filed: Apr. 12, 2013

(65) Prior Publication Data

US 2014/0305198 A1 Oct. 16, 2014

(51) Int. Cl.
*G01M 15/10* (2006.01)
*F15D 1/02* (2006.01)
*F01N 3/20* (2006.01)
*F01N 11/00* (2006.01)

(52) U.S. Cl.
CPC ............... *F15D 1/025* (2013.01); *F01N 3/208* (2013.01); *F01N 11/00* (2013.01); *G01M 15/102* (2013.01)
USPC ..................................................... 73/114.71

(58) Field of Classification Search
CPC . F01N 3/208; F01N 2560/026; F01N 13/009; F01N 11/00; F01N 2550/02; F01N 2550/05; F01N 11/002
USPC .............................. 73/114.69, 114.71, 114.75
See application file for complete search history.

(56) References Cited

U.S. PATENT DOCUMENTS

| | | | | |
|---|---|---|---|---|
| 5,495,872 A * | 3/1996 | Gallagher et al. | ............... | 138/44 |
| 7,472,545 B2 * | 1/2009 | Hemingway et al. | ........... | 60/286 |
| 7,510,172 B2 * | 3/2009 | Kojima | ........................ | 261/79.2 |
| 7,562,521 B2 * | 7/2009 | Shirai et al. | ..................... | 60/286 |
| 7,818,960 B2 * | 10/2010 | Gonze et al. | .................... | 60/286 |
| 8,209,956 B2 | 7/2012 | Wei et al. | | |
| 8,484,954 B2 * | 7/2013 | Knuth | .............. | 60/295 |
| 8,615,984 B2 * | 12/2013 | Kornherr et al. | ................ | 60/286 |
| 8,682,595 B2 * | 3/2014 | Zanetti et al. | ................... | 702/24 |
| 8,726,641 B2 * | 5/2014 | Zanetti et al. | ................... | 60/286 |
| 8,739,519 B2 * | 6/2014 | Hadden et al. | .................. | 60/317 |
| 2007/0169467 A1 | 7/2007 | Shirai et al. | | |
| 2008/0295497 A1* | 12/2008 | Kornherr et al. | ................ | 60/286 |
| 2011/0011065 A1 * | 1/2011 | Knuth | .............. | 60/295 |
| 2011/0239627 A1 * | 10/2011 | Sisken et al. | ..................... | 60/276 |
| 2011/0283678 A1 * | 11/2011 | Zanetti et al. | ................... | 60/274 |
| 2014/0033686 A1 * | 2/2014 | Fischer et al. | .................. | 60/286 |

* cited by examiner

*Primary Examiner* — Freddie Kirkland, III
(74) *Attorney, Agent, or Firm* — Miller, Matthias & Hull LLP (57) ABSTRACT

Accurate measurement of exhaust gas compounds is necessary for correct operation of exhaust treatment systems, such as Selective Catalytic Reduction (SCR) units used in diesel engines. However, accurate sensor readings assume an even distribution of compounds in an exhaust stream in order to use a sampled measurement to be extrapolated to the compound concentrations in the full stream. A structure placed in an exhaust passage downstream of an SCR reaction unit causes turbulence in the exhaust gas while developing a minimal backpressure. This turbulence helps create a more uniform distribution of compounds in the exhaust. As a result, an exhaust gas sensor gives more accurate readings even when the sensor is placed in relatively close proximity to an output of the SCR system.

19 Claims, 7 Drawing Sheets

SELECTIVE CATALYTIC REDUCTION OUTLET MIXING DEVICE

TECHNICAL FIELD

This disclosure relates to an exhaust system for a diesel engine and more particularly to a structure that promotes exhaust stream mixing after treatment in a selective catalytic reduction unit.

BACKGROUND

In the face of increasingly stringent emission requirements, engines have been required to increase the level of treatment of exhaust for compliance. Diesel particulates and various undesired nitrogen-oxygen compounds collectively referred to as "NOx" are treated using diesel particulate filters and selective catalytic reduction (SCR) units, respectively.

SCR units use a reductant such as urea in the presence of a catalyst to react NOx into less objectionable compounds such as nitrogen ($N_2$), water ($H_2O$) and carbon dioxide ($CO_2$). The amount of urea to inject into the SCR is a function of NOx measured at the output of the engine. Readings of NOx taken after the SCR unit are used for a number of things including closed-loop DEF dosing control for high NOx conversion efficiency and for detection of tampering.

SUMMARY OF THE DISCLOSURE

In one aspect, a device for use in an exhaust conduit coupled downstream of a selective catalytic reduction (SCR) unit includes a mounting attachment that couples the device to the exhaust conduit downstream of the SCR unit, an output coupling that couples the device to open air via one or more exhaust pipes, and a mixing structure coupled to the mounting attachment and the output coupling disposed in the exhaust conduit that interferes with exhaust flow in the exhaust conduit.

In another aspect, an exhaust treatment system includes a selective catalytic reduction unit arranged and adapted to receive exhaust gas from an engine, treat the exhaust gas to reduce one or more emission compounds, and discharge the exhaust gas. The exhaust treatment system may also include an exhaust conduit that receives the exhaust gas from the SCR unit, and a mixing structure disposed in the exhaust conduit.

In yet another aspect, a method of measuring NOx in an exhaust system includes receiving exhaust gas after treatment for NOx content, disturbing a flow of the exhaust at a structure disposed in an exhaust conduit carrying the exhaust gas, and measuring NOx content after the exhaust gas passes the structure.

DETAILED DESCRIPTION

As discussed above, the need for accurate measurements of NOx in emissions is important for several reasons. NOx sensors used in production vehicles sample the exhaust gas at a particular point in the exhaust stream, for example, at a sidewall of an exhaust pipe somewhere downstream of the SCR unit. In many cases, the location of the NOx sensor is determined by a commercial or retail buyer of a vehicle and is not controlled by the manufacturer of the engine or even the vehicle. The inventors have identified, however, that several factors related to placement of the NOx sensor impact the ultimate accuracy of the readings that are taken.

The inventors note that in prior art embodiments, accuracy of NOx measurements is a function of distance of the NOx sensor from the SCR unit. That is, the farther from the SCR that the sample is taken, the more accurate the NOx reading compared to that of a gas analyzer that tests the full output stream. This inaccuracy results from uneven mixing of the exhaust gases in the exhaust conduit, so that a sample taken at a NOx sensor may not be representative of the stream in total.

Figure 1:
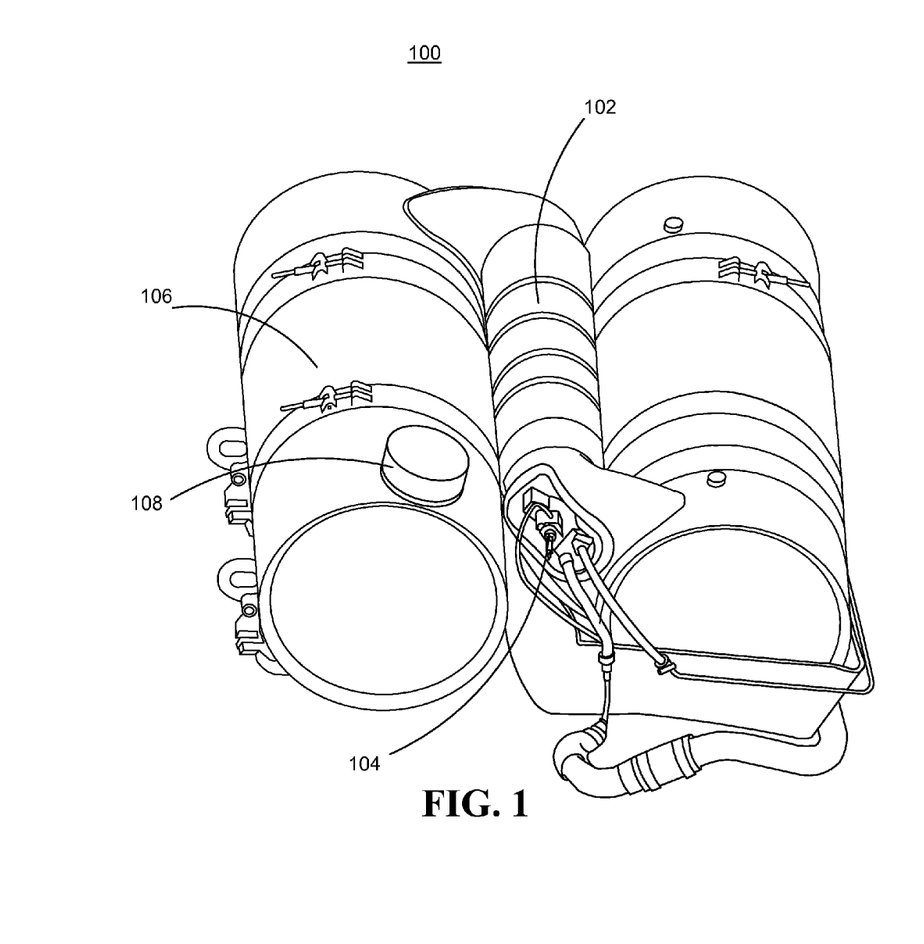
FIG. 1 is a perspective view of a selective catalytic reduction unit.
Figure 2:
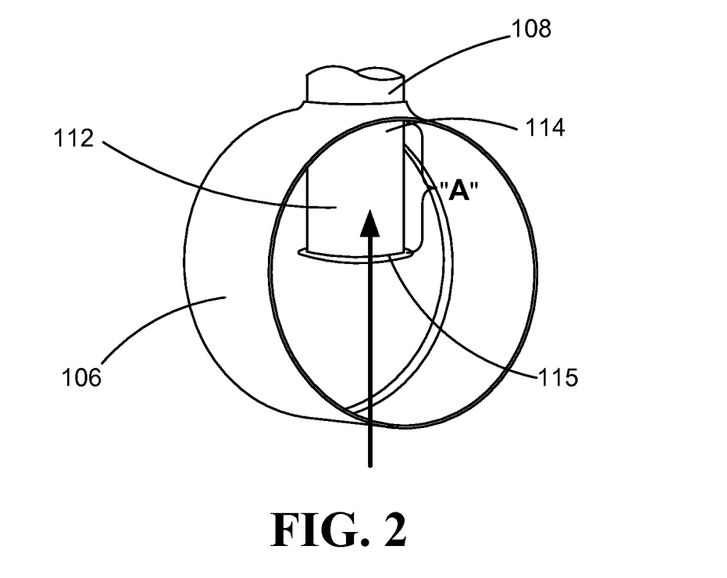
FIG. 2 is a perspective view of an embodiment of a radial mixing structure.

FIG. 1 illustrates a selective catalytic reduction (SCR) unit 100 that includes a reaction unit 102, an injector 104, an exhaust conduit 106, and an outlet connection 108. Because the SCR unit 100 may be used in a wide range of vehicles and even in fixed equipment such as generators, the output connection configurations may vary. The outlet connection 108 illustrated in FIG. 2 is radial connector attached at a top of the exhaust conduit 106. In other embodiments discussed below, the outlet connection 108 may be axial with the exhaust conduit 106 or may require 180° turn using a so-called "cobra head" connection.

Also because the SCR unit 100 may be used in a variety of vehicles and other applications, the location of the NOx sensor is largely a function of assembly requirements or may be left to owner-operator aftermarket installation. Inaccurate NOx readings are a particular problem in those installations where the NOx sensor is mounted very close to the outlet connection 108, for example, closer than 1 meter or in some cases closer than 30 cm.

In order to provide more accurate NOx readings when the placement of the NOx sensor is beyond the control of the SCR unit manufacturer, the exhaust gas mixers described below and similar structures may be used to help improve equal distribution of exhaust gas components throughout the cross-section of exhaust gases in an exhaust conduit downstream of the outlet connection 108.

FIG. 2 illustrates a radial configuration mixer 112. The mixer 112 may be a radially mounted pipe that includes a mounting attachment 114 at a circumferential wall of the exhaust conduit 106 and an output coupling 108. The distance "A" from the mounting attachment 114 to an end 115 of the mixer 112 may be vary. In different embodiments the distance "A" may be between 20% and 80% of a diameter of the exhaust conduit 106. In a particular embodiment, the distance "A" may be between 40% and 60% of the diameter of the exhaust conduit 106.

Figure 3:
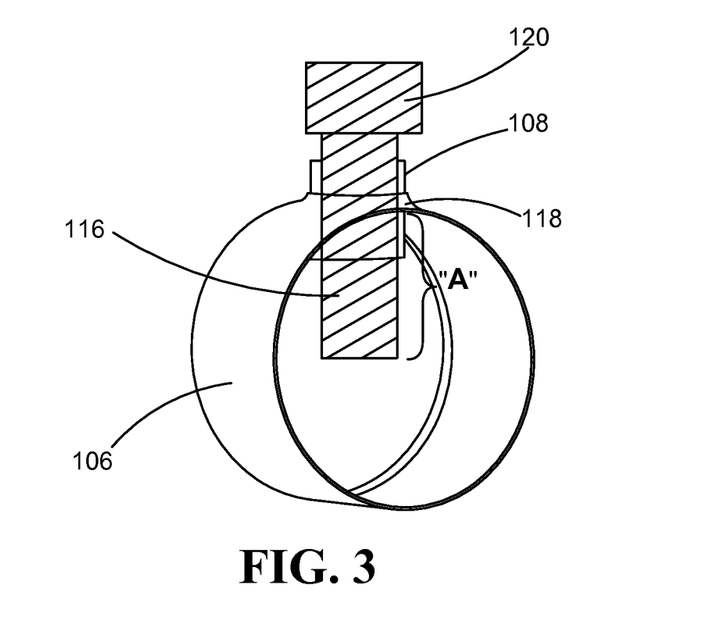
FIG. 3 is a perspective view of another embodiment of a radial mixing structure.

FIG. 3 illustrates another embodiment of a radial mixing structure 116 suitable for use in converting a prior art outlet connection 108. The radial mixing structure 116 may be inserted into the existing outlet connection 108 and upper flange 120 may be welded to the outlet connection 108 to take advantage of the mounting attachment 118 of the original outlet connection 108. As above, the distance "A" may vary in a range between 20% and 80% of diameter of the exhaust conduit 106.

Figure 4:
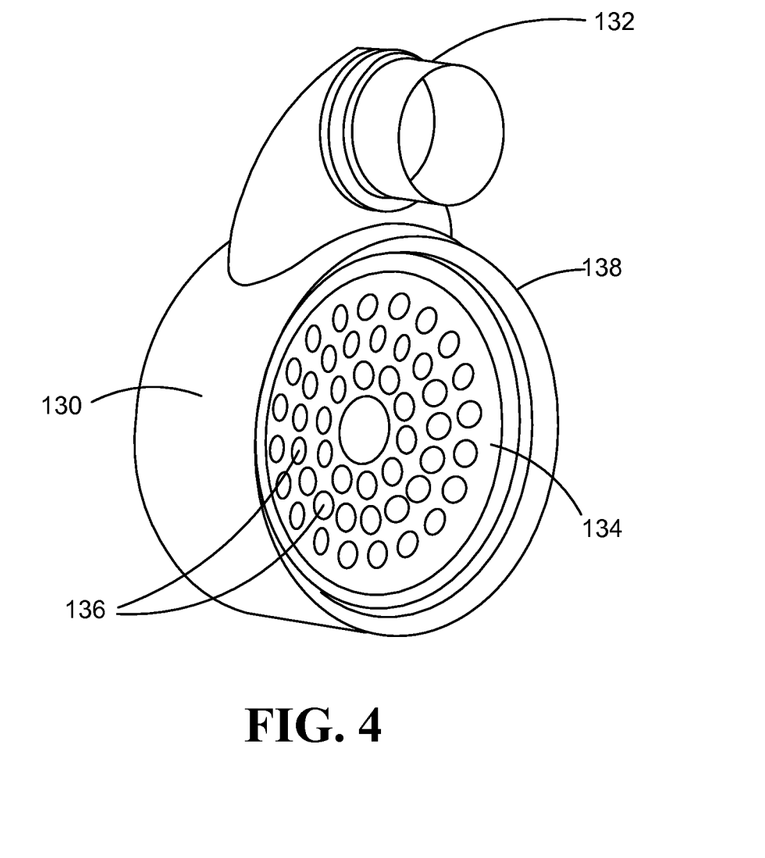
FIG. 4 is a perspective view of a cobra head outlet mixing structure.

FIG. 4 is a perspective view of a "cobra head" device 130 that may be used at an output and of an exhaust conduit 106 when an exhaust pipe (not depicted) requires a 180° bend for installation in a particular application. The device 130 may include an outlet connection 132 and a disk 134 having a plurality of perforations 136 that cause the mixing action in the exhaust stream. The device 130 may include a mounting attachment 138 that allows circumferential attachment to an open end of an exhaust conduit 106.

Figure 5:
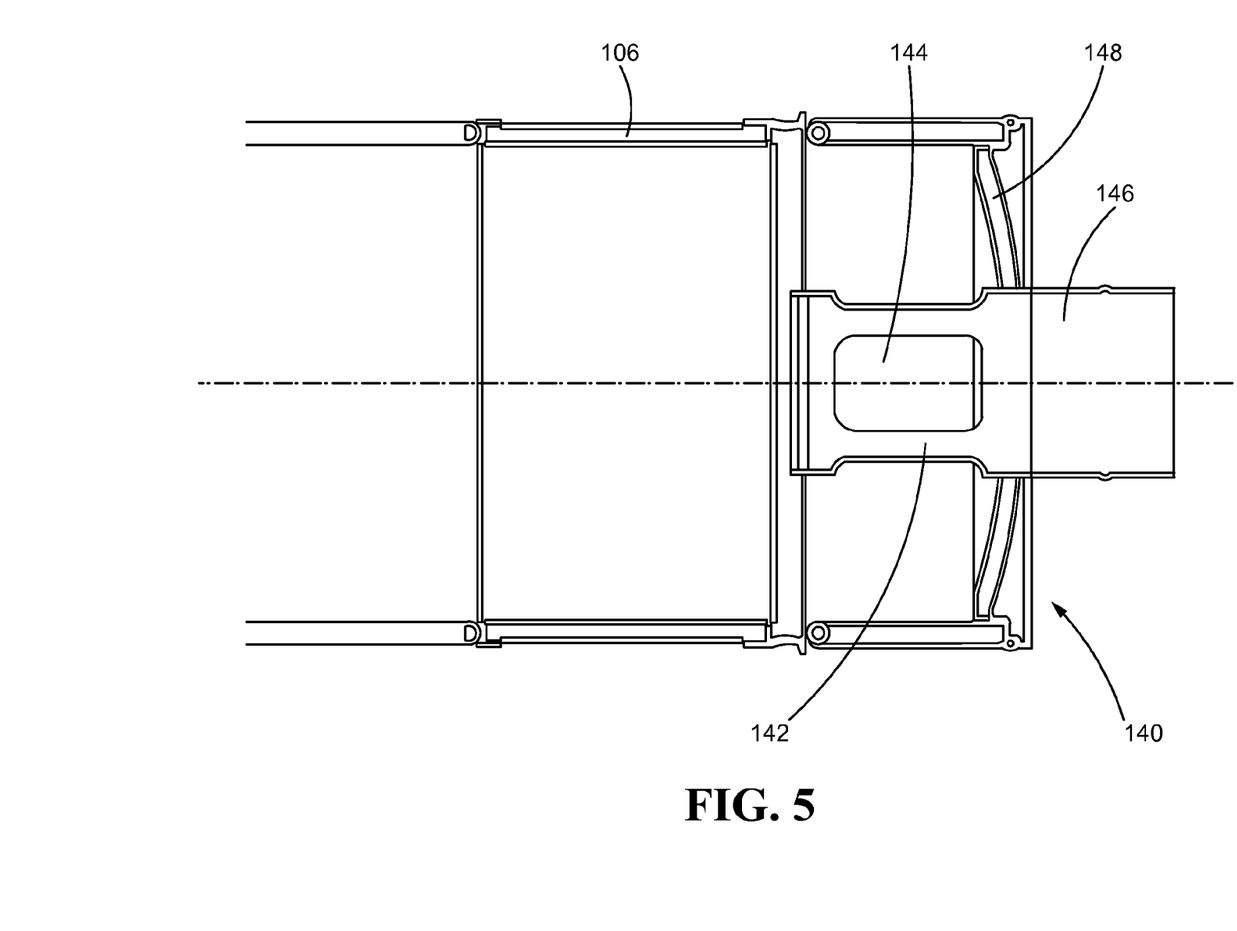
FIG. 5 is a side view of an axial mixing structure.

FIG. 5 is a side view of an axial device 140 including a cylinder 142 having a plurality of apertures 144. An extension of the cylinder 142 may form an outlet connection 146. The cylinder may be attached to the exhaust conduit via a mounting structure 148.

Figure 6:
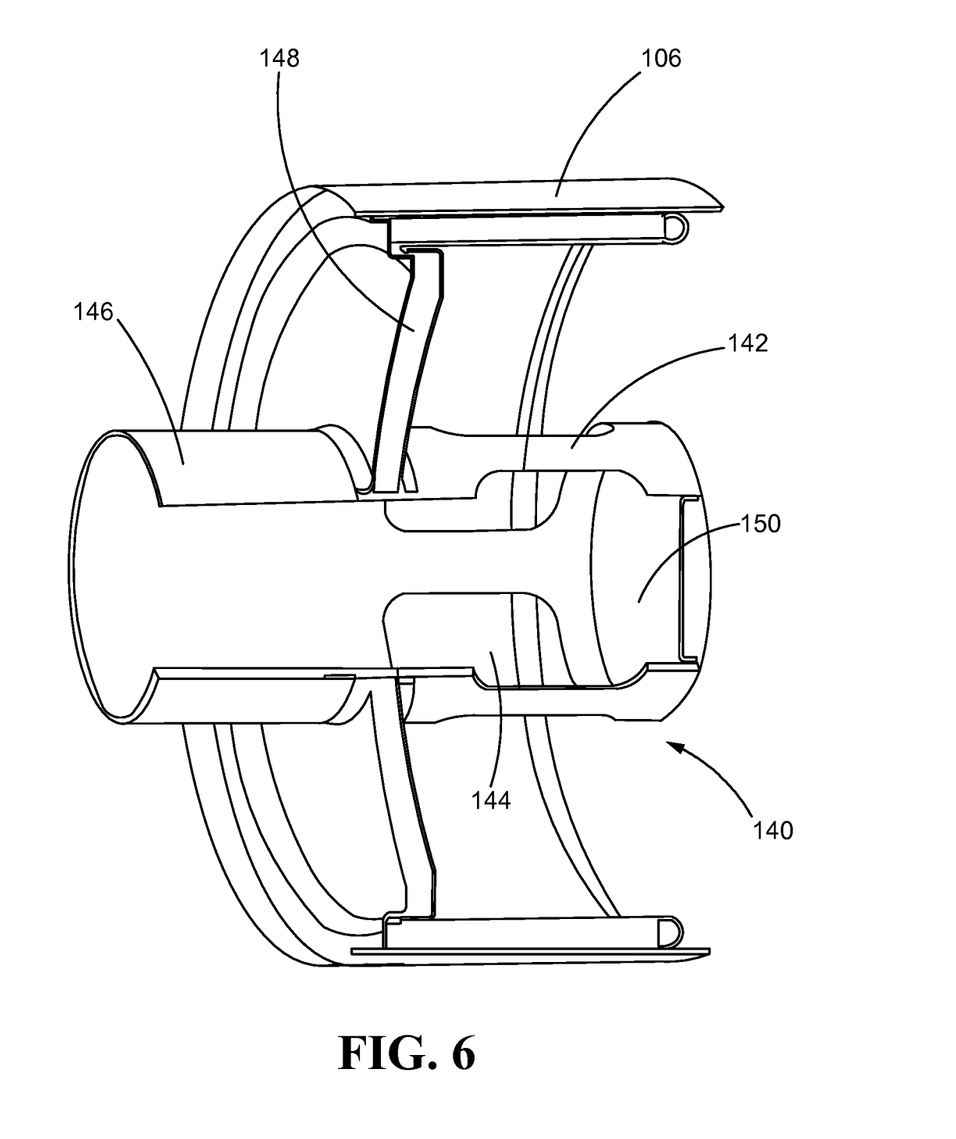
FIG. 6 is a perspective view of an embodiment of an axial mixing structure.

FIG. 6 is a perspective view of one embodiment of the axial device 140 illustrated in FIG. 5. The axial device includes the cylinder 142 having a plurality of apertures 144 that extends to form the outlet connection 146. As above, the cylinder 142 is supported via the mounting structure 148. In this embodiment, an upstream end of the cylinder 142 includes a covered base 150 that is normal to flow of exhaust through the exhaust conduit 106. The number of apertures 144 may be varied. For example, an embodiment may include three apertures while another embodiment may include four or more apertures.

Figure 7:
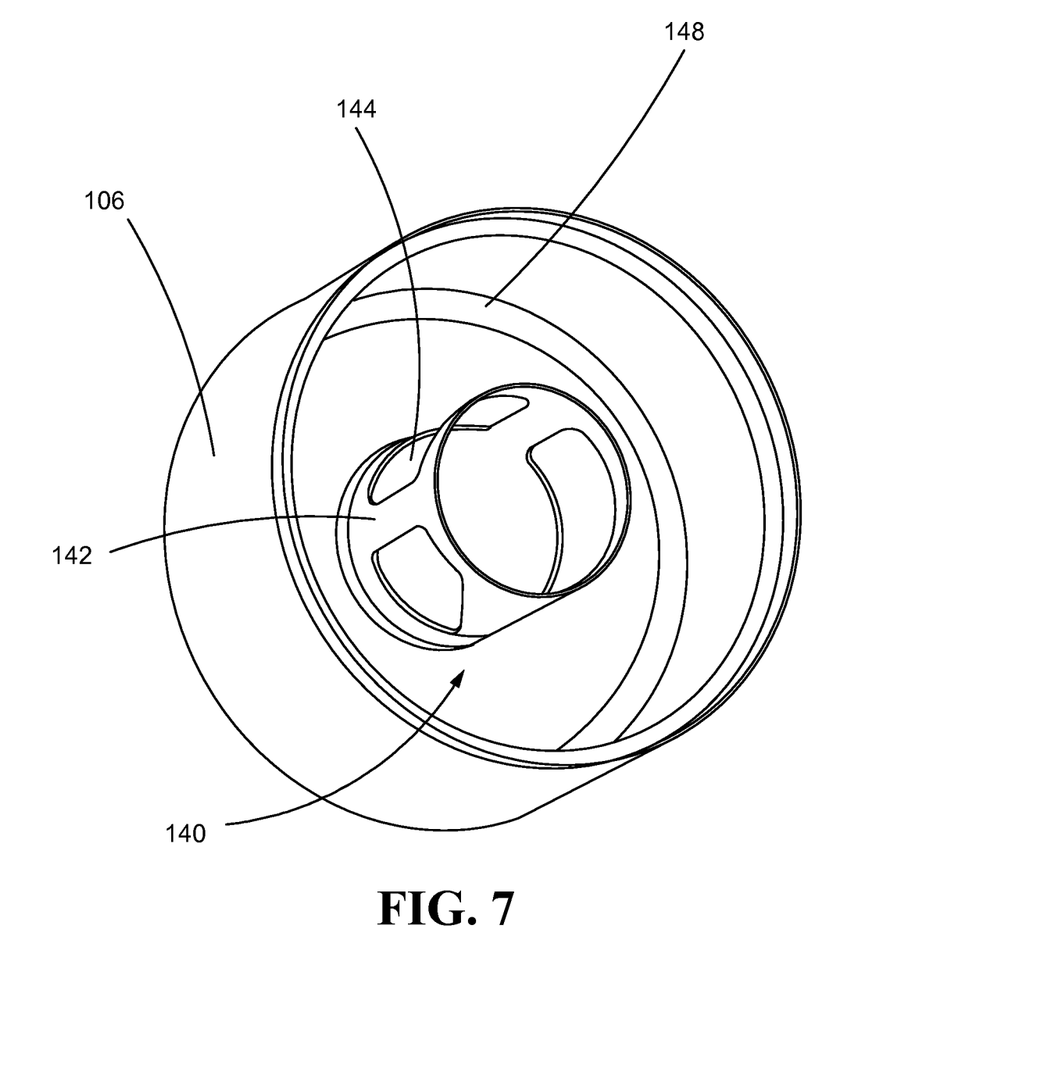
FIG. 7 is a perspective view of another embodiment of an axial mixing structure.

FIG. 7 illustrates a perspective view of another embodiment of the axial mixer 140. The axial mixer 140 is the same as described above in FIG. 6 however the covered base 150 is not present and the cylinder 142 is open to exhaust flowing directly down a center of the exhaust conduit 106. Mixing is however provided via the cylinder 142 and apertures 144 due to the redirection of gases flowing in from outer portions of the exhaust conduit 106.

Figure 8:
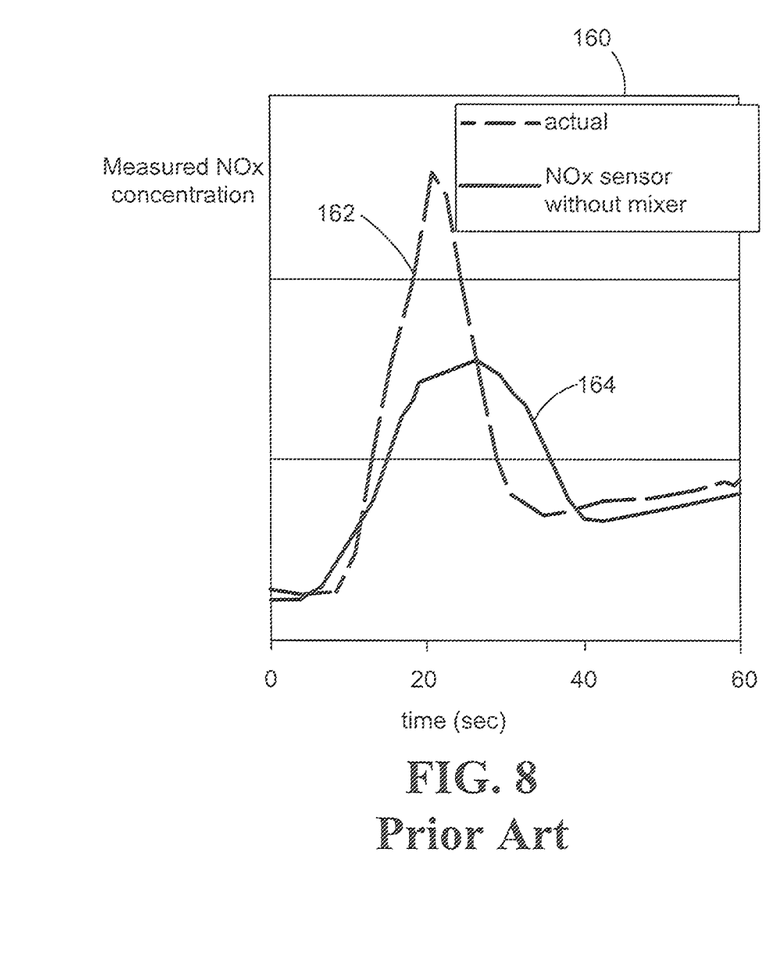
FIG. 8 is a prior art graph of actual versus measured NOx.

FIG. 8 illustrates a prior art graph 160 showing actual NOx content 162 in an exhaust pipe versus NOx content measured with an NOx sensor. In this case, no mixing structure was present. The actual measurements 162 are taken at an exhaust gas analyzer that provides a laboratory quality measurement of exhaust gas components. As can be seen, while some portions of the exhaust are measured relatively accurately, the sampled measurement 164 misses the spike in NOx found with the exhaust gas analyzer.

Figure 9:
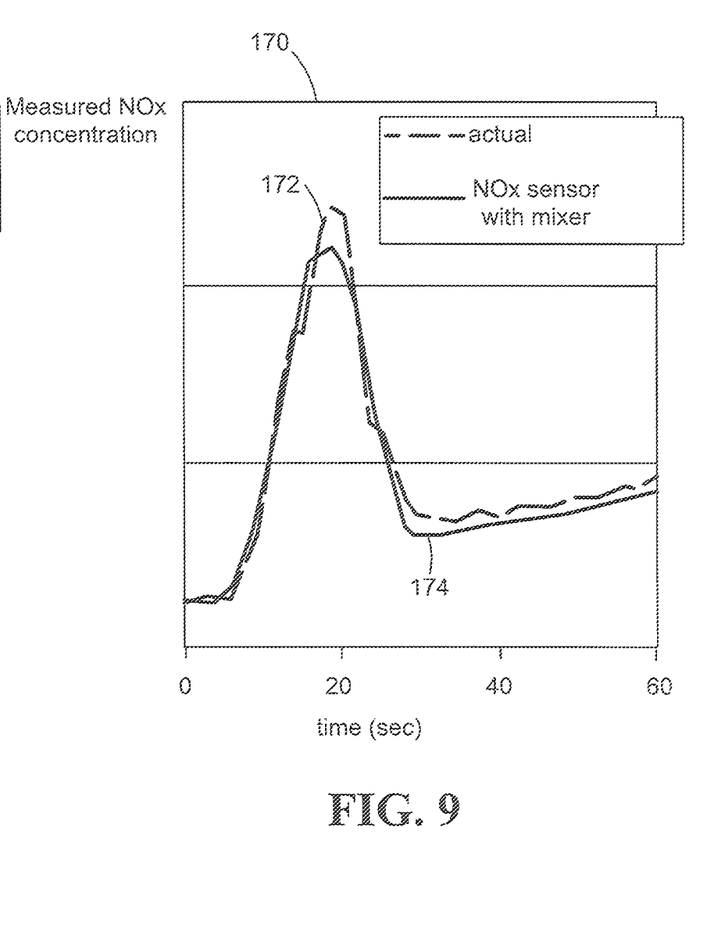
FIG. 9 is a graph of actual versus measured NOx using a mixing structure in accordance with the current disclosure.

FIG. 9 illustrates a chart 170 showing results of exhaust gas measurements with a mixing structure in place at an output of the SCR unit. As can be seen, the sampled values 174 closely track the actual readings 172 and illustrate the effectiveness of the mixing structure in improving reading accuracy.

INDUSTRIAL APPLICABILITY

In operation, exhaust gas leaving a selective catalytic reduction unit 100 has its flow disturbed by a structure 112 disposed in an exhaust conduit downstream of the SCR unit 100 that carries the exhaust gas. This allows measuring NOx content after the exhaust gases pass the structure 112 and are mixed to provide a more uniform distribution of exhaust gas components for measurement and a downstream NOx sensor.

In an embodiment, a mixing structure 140 may receive exhaust gas after treatment for NOx content and disturb a flow of the exhaust gas at a structure 142 disposed in an exhaust conduit 106 carrying the exhaust gas. The NOx content can be measured after the exhaust gas passes the structure 140. The exhaust gas may be received from an SCR treatment unit 102.

The use of mixing structure 112, any of the other mixing structures described above, or other similar structures can be seen to significantly increase the accuracy of NOx sensor measurements downstream of a selective catalytic reduction unit 100. Such designs achieve these results while incurring less than 0.5 kPa of back pressure between an input of the mixing structure and an output of the mixing structure so that other components of engine operating efficiency are not sacrificed.

The improved accuracy benefits owner-operators by freeing them to mount NOx sensors anywhere after the SCR unit that is convenient and also benefits engine and SCR manufacturers by allowing them to provide a unit that accurately portrays emission conditions.

What is claimed is:

1. A device for use in an exhaust conduit coupled downstream of a selective catalytic reduction (SCR) unit, the device comprising:
   a mounting attachment coupled to the exhaust conduit downstream of the SCR unit; and
   a mixing structure coupled to the mounting attachment and configured to interfere with exhaust flow in the exhaust conduit, wherein, the SCR unit, the device, and a NOx sensor are consecutively mounted in the downstream flow of exhaust absent any other intervening structures in the exhaust conduit.

2. The device of claim 1, wherein the mixing structure is an axial mixer comprising a cylinder having a plurality of apertures and a covered base that is normal to a flow of exhaust through the exhaust conduit, the covered base at an end of the cylinder opposite the output coupling.

3. The device of claim 1, wherein the mixing structure is an axial mixer comprising a cylinder having a plurality of apertures and is free of a covered base.

4. The device of claim 1, wherein the mixing structure is a radial pipe mounted through a circumferential wall of the exhaust conduit, the radial pipe extending into the exhaust conduit.

5. The device of claim 4, wherein the radial pipe extends into the exhaust conduit between 10% and 50% of a diameter of the exhaust conduit.

6. The device of claim 1, wherein the mixing structure is a perforated disk disposed in the exhaust conduit.

7. The device of claim 1, wherein the exhaust conduit is defined by one or more hollow structures.

8. The device of claim 1, wherein the mixing structure introduces less than 0.5 kPa of backpressure between an input of the mixing structure and an output of the mixing structure.

9. An exhaust treatment system comprising:
   a selective catalytic reduction (SCR) unit arranged and adapted to receive exhaust gas from an engine, treat the exhaust gas to reduce one or more emission compounds, and discharge the exhaust gas;
   a portion of an exhaust conduit located downstream of the SCR unit that receives the exhaust gas from the SCR unit;
   a NOx sensor coupled to the portion of the exhaust conduit; and
   a mixing structure disposed in the portion of the exhaust conduit, the mixing structure in consecutive order between the SCR unit and the NOx sensor.

10. The exhaust treatment system of claim 9, wherein the NOx sensor is mounted less than 1 meter from the mixing structure.

11. The exhaust treatment system of claim 9, wherein the mixing structure is an axial mixer comprising a cylinder having a plurality of apertures and a covered base that is normal to a flow of exhaust through the exhaust conduit, the covered base at an end of the cylinder opposite the output coupling.

12. The exhaust treatment system of claim 9, wherein the mixing structure is an axial mixer comprising a cylinder having a plurality of apertures and is free of a covered base.

13. The exhaust treatment system of claim 9, wherein the mixing structure is a radial pipe mounted through a circumferential wall of the exhaust conduit, the radial pipe extending into the exhaust conduit.

14. The exhaust treatment system of claim 13, wherein the radial pipe extends into the exhaust conduit between 10% and 50% of a diameter of the exhaust conduit.

15. The exhaust treatment system of claim 9, wherein the mixing structure is a perforated disk disposed in the exhaust conduit.

16. The exhaust treatment system of claim 9, wherein the exhaust conduit is defined by one or more hollow structures.

17. The exhaust treatment system of claim 9, wherein the mixing structure introduces less than 0.5 kPa of backpressure between an input of the mixing structure and an output of the mixing structure.

18. A method of measuring NOx in an exhaust system, the method comprising:
   receiving exhaust gas via an exhaust conduit after treatment for NOx content;
   disturbing a flow of the treated exhaust gas at a mixing structure disposed in the exhaust conduit carrying the exhaust gas; and
   measuring NOx content after the treated exhaust gas passes the mixing structure.

19. The method of claim 18, wherein receiving the exhaust gas after treatment comprises receiving the exhaust gas after treatment at a selective catalytic reduction unit.

\* \* \* \* \*